United States Patent
Sekine et al.

(10) Patent No.: US 6,297,829 B1
(45) Date of Patent: Oct. 2, 2001

(54) IMAGE PROCESSING APPARATUS, IMAGE OUTPUT DEVICE, IMAGE PROCESSING METHOD AND RECORD MEDIUM ON WHICH IMAGE PROCESSING PROGRAM IS RECORDED

(75) Inventors: Hiroshi Sekine; Shigeru Tsukimura; Hiroyuki Kawano, all of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/204,348

(22) Filed: Dec. 4, 1998

(30) Foreign Application Priority Data

Dec. 16, 1997 (JP) .................................................. 9-346400

(51) Int. Cl.$^7$ .................................................. G06T 11/20
(52) U.S. Cl. ...................... 345/467; 345/155; 345/150; 345/153; 345/429
(58) Field of Search .................................... 345/429, 155, 345/150, 153, 467

(56) References Cited

U.S. PATENT DOCUMENTS 5,294,918 * 3/1994 Preston et al. ........................ 345/155
5,400,056 * 3/1995 Colles .................................... 345/199
5,854,620 * 12/1998 Mills et al. ............................ 345/153

FOREIGN PATENT DOCUMENTS 4-195268   7/1992  (JP) .

* cited by examiner

Primary Examiner—Jeffery Brier
Assistant Examiner—Motilewa Good-Johnson

(57) ABSTRACT

To secure high quality, require no bulk memory and reduce processing time when code image data is expanded to plotted pattern data, a binary expansion section for expanding code image data to binary plotted pattern data, a multivalued expansion section for expanding code image data to multivalued plotted pattern data and an expansion method determining section for judging whether code image data is data for plotting a character and a line or not and whether code image data meets a predetermined condition or not and determining the expansion section to be applied are provided, and code image data is applied to the expansion section determined by the expansion method determining section.

19 Claims, 16 Drawing Sheets

200: IMAGE PROCESSING SECTION

FIG.4A

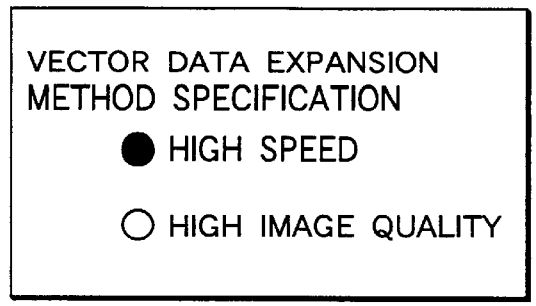

FIG.4B

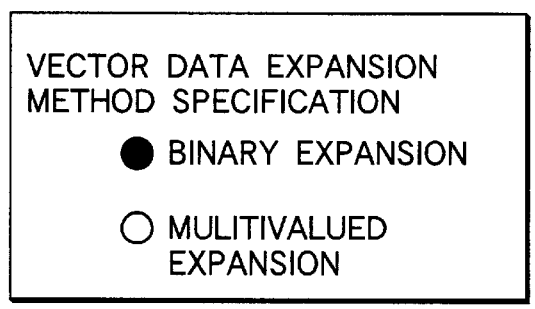

FIG.5

FONT TABLE

| | FONT TYPE | SPECIFICATION FOR EXPANSION METHOD |
|---|---|---|
| JAPANESE FONT | MINCHO TYPEFACE A | MULTIVALUED EXPANSION ALLOWED |
| | MINCHO TYPEFACE B | ONLY BINARY EXPANSION |
| | SAN SERIF FONT A | ONLY BINARY EXPANSION |
| | SAN SERIF FONT B | MULTIVALUED EXPANSION ALLOWED |
| EUROPEAN FONT | TIMES | ONLY BINARY EXPANSION |
| | ARIAL | MULTIVALUED EXPANSION ALLOWED |
| | COURIER | MULTIVALUED EXPANSION ALLOWED |
| | CENTURY | MULTIVALUED EXPANSION ALLOWED |

FIG.6

CHARACTER CODE TABLE

| CHARACTER | CHARACTER CODE | SPECIFICATION FOR EXPANSION METHOD |
|---|---|---|
| ⋮ | ⋮ | ⋮ |
| @ | 40 | ONLY BINARY EXPANSION |
| A | 41 | MULTIVALUED EXPANSION ALLOWED |
| B | 42 | ONLY BINARY EXPANSION |
| C | 43 | MULTIVALUED EXPANSION ALLOWED |
| D | 44 | MULTIVALUED EXPANSION ALLOWED |
| E | 45 | MULTIVALUED EXPANSION ALLOWED |
| F | 46 | MULTIVALUED EXPANSION ALLOWED |
| G | 47 | ONLY BINARY EXPANSION |
| H | 48 | MULTIVALUED EXPANSION ALLOWED |
| I | 49 | MULTIVALUED EXPANSION ALLOWED |
| J | 4A | MULTIVALUED EXPANSION ALLOWED |
| K | 4B | ONLY BINARY EXPANSION |
| L | 4C | MULTIVALUED EXPANSION ALLOWED |
| M | 4D | ONLY BINARY EXPANSION |
| N | 4E | MULTIVALUED EXPANSION ALLOWED |
| O | 4F | MULTIVALUED EXPANSION ALLOWED |
| P | 50 | MULTIVALUED EXPANSION ALLOWED |
| ⋮ | ⋮ | ⋮ |

FIG.16A
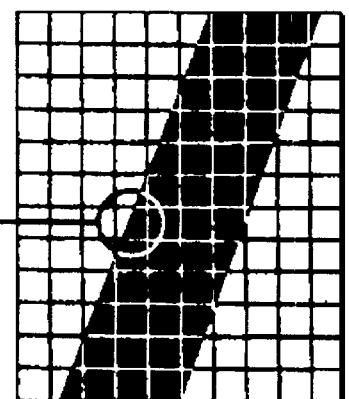
FIG.16B
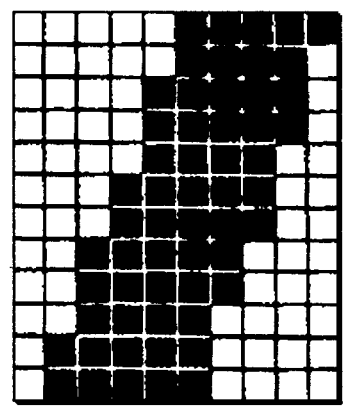
FIG.16C
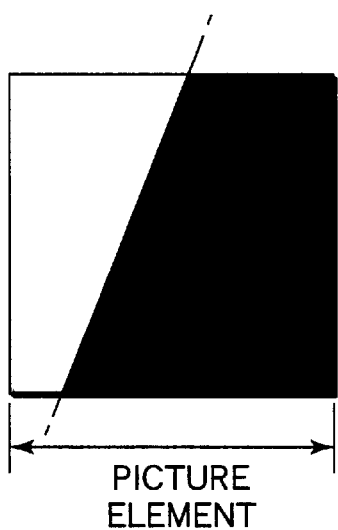
PICTURE ELEMENT
FIG.16D
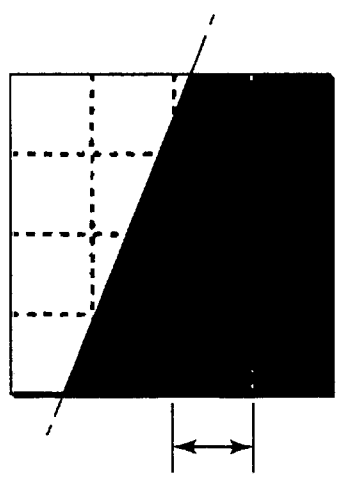
SUBPIXEL
FIG.16E
PIXEL VALUE = 10
| 0 | 0 | 1 | 1 |
|---|---|---|---|
| 0 | 0 | 1 | 1 |
| 0 | 1 | 1 | 1 |
| 0 | 1 | 1 | 1 |

FIG.17B BINARIZATION PROCESSING

| PIXEL VALUE =0 (0%) | PIXEL VALUE =0 (0%) | PIXEL VALUE =0 (0%) |
|---|---|---|
| PIXEL VALUE =1 (100%) | PIXEL VALUE =1 (100%) | PIXEL VALUE =1 (100%) |
| PIXEL VALUE =0 (0%) | PIXEL VALUE =0 (0%) | PIXEL VALUE =0 (0%) |

FIG.17C MULTIVALUING PROCESSING

| PIXEL VALUE =0 (0%) | PIXEL VALUE =0 (0%) | PIXEL VALUE =0 (0%) |
|---|---|---|
| PIXEL VALUE =4 (25%) | PIXEL VALUE =4 (25%) | PIXEL VALUE =4 (25%) |
| PIXEL VALUE =0 (0%) | PIXEL VALUE =0 (0%) | PIXEL VALUE =0 (0%) |

IMAGE PROCESSING APPARATUS, IMAGE OUTPUT DEVICE, IMAGE PROCESSING METHOD AND RECORD MEDIUM ON WHICH IMAGE PROCESSING PROGRAM IS RECORDED

BACKGROUND OF THE INVENTION

The present invention relates to an image processing apparatus, an image output device and an image processing method respectively for visually smoothing ridges on the edge if necessary when a character, a line and others are output and a record medium on which an image processing program for instructing a computer to execute the image processing is recorded. Further, the present invention also relates to color facsimile machines, or to transmission/reception of images of the Internet.

Generally, if code image data such as a page description language (PDL) is used, image data such as a photograph and an image in which a line, a character and others are mixed can be output to different types of terminals by a common output device and can be output to different output devices in common. Therefore, code image data is widely used in outputting an image.

As an area in which such code image data is plotted is defined by vector data and outline data in various plotting instructions as well-known, the contents of code image data are required to be interpreted and to be expanded (converted) to plotted pattern data which is image data when the code image data is output to a printer, a display and others.

A case that a straight line shown in FIG. 16A is formed by code image data will be examined below. In this case, when binarization processing is executed for the following picture element if an area to be plotted is overlapped with a part of a picture element, ridges are remarkable on the edge of a line formed by the plotted pattern data as shown in FIG. 16B.

When a character and a line are output, smoothing processing for visually smoothing ridges is applied.

When for an example of the processing, a case that a picture element encircled as shown in FIG. 16A is in a state shown in FIG. 16C is explained, first, the picture element is divided into plural (for example, 16) subpixels as shown in FIG. 16D. Second, if an area to be plotted accounts for a half of the area of the subpixels or more, a pixel value '1' is given to the subpixels as shown in FIG. 16E, however, in the meantime, if the area does not account for a half or more, a pixel value '0' is given to the subpixels. There are various methods in judgment for giving a pixel value. Third, the total pixel values of the divided subpixels are equivalent to the multivalued pixel value of the picture element. In the example shown in FIG. 16E, the pixel value of the picture element is multivalued as '10'.

As a picture element on the edge is a halftone between an area to be plotted and an area not plotted when a picture element of a character, a line and others is multivalued as described above, ridges are visually inhibited.

In the example shown in FIGS. 16D and 16E, as a picture element is divided into 16 subpixels, a gradient by multivaluing is 17 gradations of zero to 16 and the gradient can be increased by dividing into further multiple subpixels.

In the Unexamined Japanese Patent Application Publication No. Hei 4-195268, technique for optimizing the shape of a subpixel, the number of divided subpixels and others according to the gradient of vector data in multivaluing is disclosed. According to this technique, ridges can be also made inconspicuous.

As described above, the quality of output vector data in code image data can be enhanced by arranging multivalued pixels on the edge.

However, to expand vector data to multivalued plotted pattern data, the vector data is required to be expanded at higher resolution than the resolution of output equipment and to be temporarily stored because a picture element is divided into subpixels. Therefore, there is a problem that a bulk memory is required, compared with a case that no smoothing processing is executed and further, processing time is also extended.

A case that a thin line is formed, compared with the size of one picture element as shown in FIG. 17A will be examined below. In this case, binarization processing in which if an area to be plotted is overlapped with a part of a picture element, '1' is given to the picture element or if an area to be plotted is overlapped with the center of a picture element, '1' is given to the picture element is executed, a result shown in FIG. 17B is obtained.

In the meantime, when the above multivaluing processing is executed for the line shown in FIG. 17A, a pixel value becomes very small and the density of an output line is reduced as a result.

Therefore, depending upon a case, binarization processing may be more excellent than multivaluing processing as a result in the aspect of the quality of output, recognition in optical reading and others.

In the example shown in FIGS. 17, a pixel value '1' in the case of binarization processing is equivalent to a pixel value '16' in the case of multivaluing processing and in both cases, the density of a corresponding picture element is 100%.

SUMMARY OF THE INVENTION

The present invention is made to solve the above problem and the object is to reduce processing time without requiring a bulk memory by executing smoothing processing if necessary when code image data is expanded to plotted pattern data and to provide an image processing apparatus wherein ridges are inconspicuous and a high quality of plotting pattern can be generated, an image output device wherein the output of an image is enabled, an image processing method and further, a record medium on which an image processing program for instructing a computer to execute the image processing is recorded.

To achieve the above object, an image processing apparatus according to the present invention is based upon an image processing apparatus for expanding code image data to plotted pattern data and characterized in that first expansion means for expanding code image data to binarized plotted pattern data, second expansion means for expanding code image data to multivalued plotted pattern data and selection means for selecting and applying either the above first or second expansion means as expansion means for expanding code image data are provided.

According to the present invention, although ridges on the edge of a character, a line and others may be conspicuous when code image data in which an instruction for plotting a character, a line and others is described is interpreted and expanded to plotted pattern data which is its bit image, either the first expansion means by which processing is executed at high speed or the second expansion means by which the edge of a character, a line and others is visually smoothed by multivaluing is suitably selected and applied according to a situation.

For the criterion of judgment for selection, if a line is output, the length, the width, an angle and others are conceivable. The reason is that as the smaller either the length of the line or the width is, compared with a picture element or the closer to level or a perpendicular the angle of the line is, the more conspicuous ridges on the edge are, expansion means used for expansion processing is required to be suitably selected according to the width and the angle of the line.

Also, for the criterion of judgment for selection, if a character is output, the typeface, the size, a character code and others are suitable. Because it is determined according to these individual conditions whether ridges are conspicuous on the edge of a character or not.

In the meantime, it is required to be considered that processing speed may be given priority over the quality of output. In this case, as time required for processing by the second expansion means is longer, compared with that by the first expansion means, a desirable result can be obtained if time required for processing by the former is estimated and expansion means used for expansion processing is selected based upon a result of the estimate.

Further, for the criterion of judgment for selection, judgment by a user is also important. Therefore, it is desirable that a user himself/herself can select expansion means used for expansion processing.

BRIEF DESCRIPTION OF THE DRAWINGS

FIGS. 4A and 4B respectively show examples of screens displayed when multivalued expansion is specified via a console panel or a host computer;

FIG. 5 shows an example of the contents of a font table in the image processing section;

FIG. 6 shows an example of the contents of a character code table in the image processing section;

FIGS. 16A to 16E respectively explain conventional type binary expansion and multivalued expansion; and FIGS. 17A to 17C respectively explain conventional type problems.

DETAILED DESCRIPTION OF THE PREFERRED EMBODIMENTS

Figure 1:
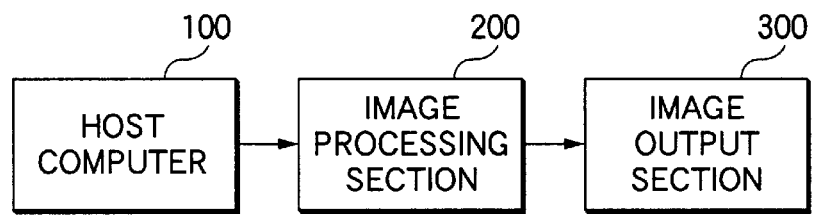
FIG. 1 is a block diagram showing the configuration of the whole system provided with an image processing section equivalent to an embodiment of the present invention.

Referring to the drawings, embodiments of the present invention will be described below.

<1: Whole System>

FIG. 1 is a block diagram showing the configuration of the whole system including an image processing section equivalent to an embodiment of the present invention. As shown in FIG. 1, a host computer 100 outputs image data to be output as code image data such as PDL. The image processing section 200 interprets code image data and expands it to raster data (plotted pattern data) showing a raster image using the outline data of a character in it and the vector data of a line.

An image output section 300 outputs an image according to raster data, and a printer, a display and others are equivalent to the image output section.

Although outline data and vector data are not strictly distinguished, information for defining the contour of a character is called outline data for convenience of explanation and information for defining the contour or the endpoints of a line is called vector data. If a character is output, data for defining a character to be output such as a character code, the typeface, the size, the style such as italics, stroke weight such as boldface, outline data for defining the contour of a character and coordinate data for plotting on a page is required and these are called font data in total.

In FIG. 1, each block in the system is shown separately for convenience of explanation. That is, the image processing section 200 may also actually expand code image data to raster data as one function of the host computer 100 and may also expand as one function of the image output section 300. Further, the image processing section may also be a standalone type as shown in FIG. 1.

If the image processing section 200 functions as a function of the host computer 100, the host computer 100 expands and outputs code image data to raster data by executing the similar operation described later to that of the image processing section in a predetermined program. In the meantime, if the image processing section functions as a function of the image output section 300 as the latter, the image output section 300 similarly expands code image data to raster data by executing the similar operation to that of the image processing section and outputs an image based upon the data.

In either case, the type of connection between the blocks is free. That is, the blocks may be also connected via a network or may be also directly connected via a cable.

<1-2: Image Processing Section>

Next, the detailed configuration of the image processing section 200 will be described. In principle, a case that the image processing section 200 is a stand-alone type as shown in FIG. 1 or a case that the image processing section functions as a function of the image output section 300 will be described below.

<1-2-1: Hardware Configuration>

Figure 2:
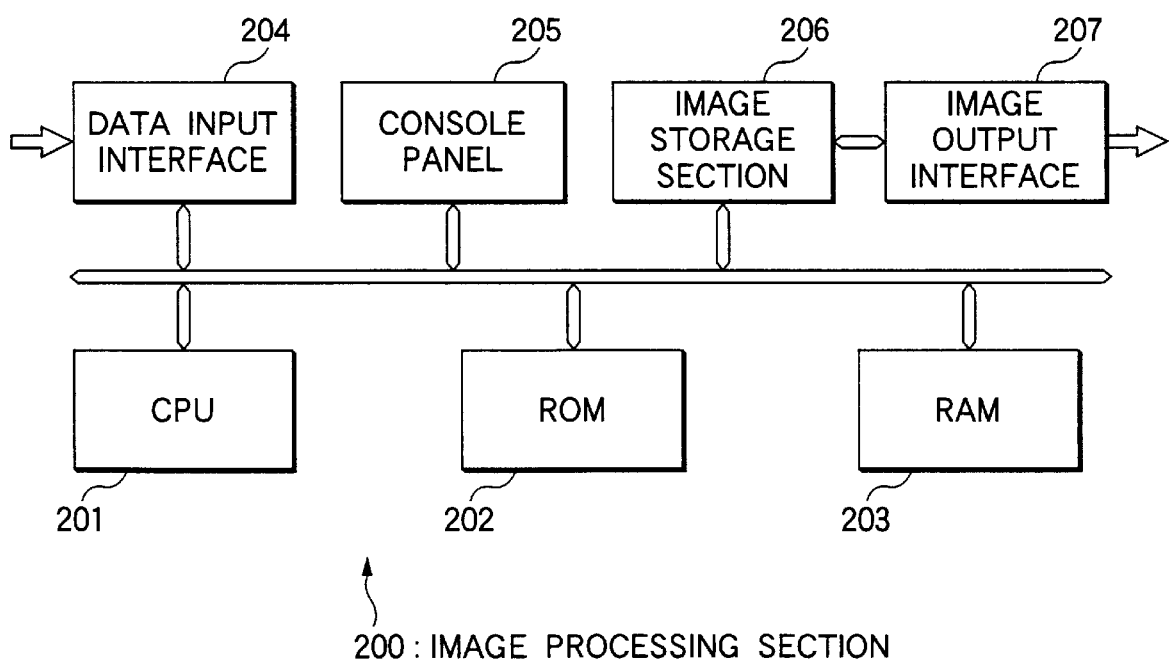
FIG. 2 is a block diagram showing the hardware configuration of the image processing section.

First, referring to FIG. 2, the hardware configuration of the image processing section will be described. As shown in FIG. 2, CPU 201 executes expansion processing as a functional block described later configured by a program stored in ROM 202 and at this time, temporarily uses RAM 203 as a work area. In addition, RAM 203 may store a font table used for specifying a method of expanding a character to be output, a character code table used for specifying an expansion method by a character code and others. The contents of these tables will be described later.

In the meantime, a data input interface 204 is provided to input code image data to be expanded.

Next, a console panel 205 is provided to input an instruction for operation by a user and particularly, in this embodiment, is used to set the contents described later of the font table and the character code table and specify multivalued expansion.

Specification for multivalued expansion means that a user instructs smoothing processing, means that multivalued expansion is enabled and a user can set on screens shown in FIGS. 4A and 4B. If smoothing processing by multivalued expansion is not allowed as in case "high speed" and "binary expansion" are specified, only binary expansion is specified, however, in the meantime, if the quality of an image is given priority as in case "high quality of image" and "multivalued expansion" are specified, multivalued expansion is specified and according to a procedure described later, binary expansion or multivalued expansion is selected and expansion processing is executed.

Items set on the console panel 205 including the contents of the font table and the character code table can be also set from the host computer 100 remotely.

An image storage section 206 is a so-called page memory and temporarily stores raster data every page. That is, the image storage section 206 corresponds to the resolution of the image output section 300, and a picture element and a storage area correspond by one to one.

An image output interface 207 is provided to output raster data stored in the image storage section 206 to the image output section 300.

RAM 203 and the image storage section 206 are not required to be strictly distinguished and actually, an area allocated as a part of RAM 203 is used for the image storage section 206.

If the image processing section 200 functions as a function of the host computer 100, CPU 201 executes expansion processing as a functional block described later and configured by an operating system (OS), an application program and others. In this case, if CPU 201 is provided with a part for receiving code image data from OS and an application program, the data input interface 204 is not required to be separately provided.

<1-2-2: Functional Configuration>

Next, referring to FIG. 3, the functional configuration of the image processing section 200 configured by the hardware configuration shown in FIG. 2 will be described.

Figure 3:
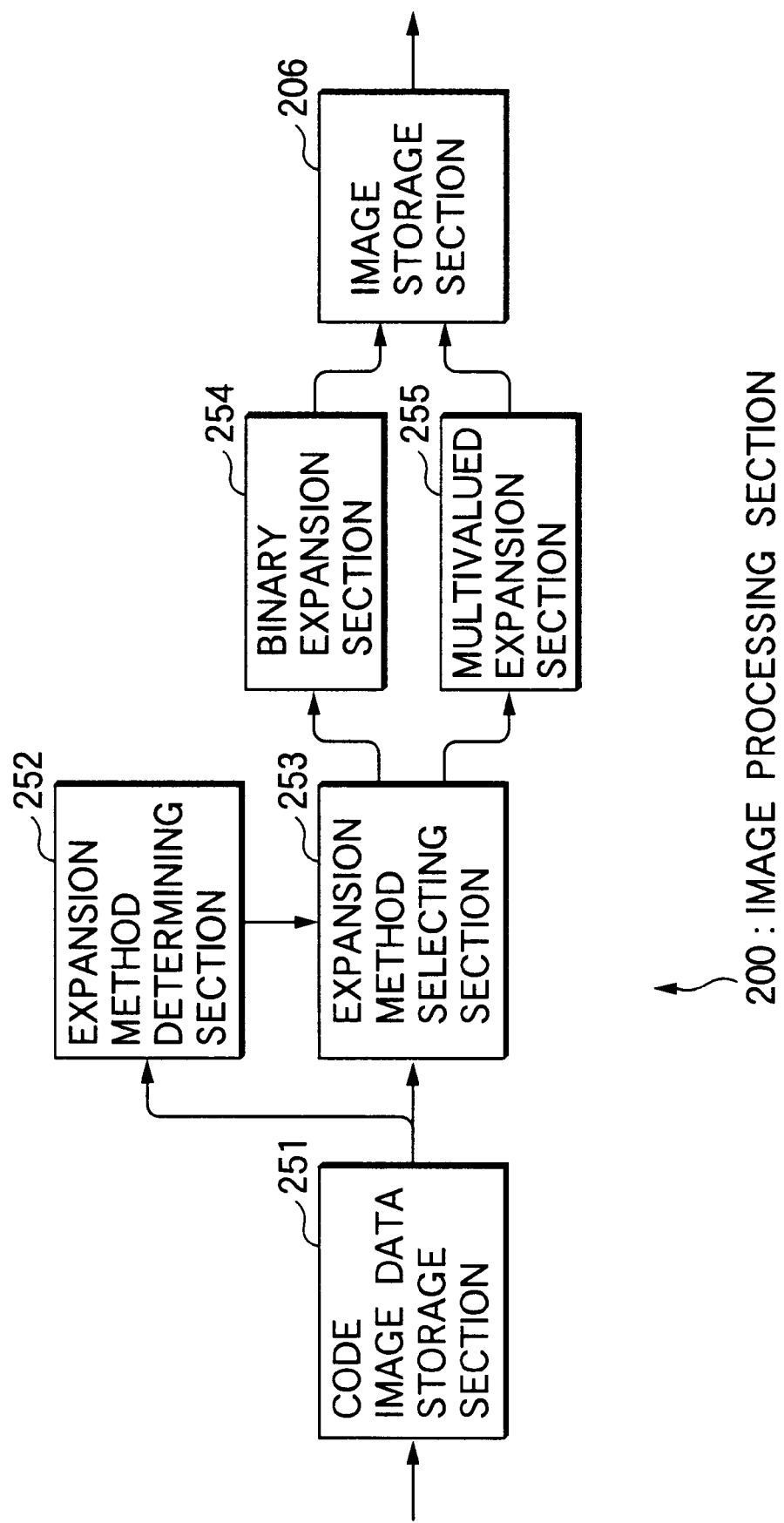
FIG. 3 is a block diagram showing the functional configuration of the image processing section.

As shown in FIG. 3, a code image data storage section 251 stores code image data received from the host computer 100. Such a code image data storage section 251 functions as in case CPU 201 shown in FIG. 2 temporarily stores code image data input via the data input interface 204 in RAM 203.

An expansion method determining section 252 determines whether binary expansion is applied or multivalued expansion is applied according to a procedure described later when a character and a line are expanded.

An expansion method selecting section 253 supplies code image data stored in the code image data storage section 251 to either a binary expansion section 254 or a multivalued expansion section 255 according to a result determined by the expansion method determining section 252.

The binary expansion section 254 simply expands code image data to raster data in a binary system.

In the meantime, the multivalued expansion section 255 expands code image data to raster data in a multivalued system to execute smoothing processing.

The above expansion method determining section 252, expansion method selecting section 253, binary expansion section 254 and the multivalued expansion section 255 function as in case CPU 201 shown in FIG. 2 first interprets font data and vector data included in code image data stored in RAM 203, determines in which expansion method they are to be expanded and second expands outline data and vector data in an expansion method according to a result of the determination.

The image storage section 206 synthesizes and stores raster data expanded by the binary expansion section 254 or the multivalued expansion section 255 every page. That is, CPU 201 shown in FIG. 2 writes raster data expanded according to an either method to an address corresponding to plotted coordinates on a page in the image storage section 206.

Raster data stored in the image storage section 206 is read in a direction in which the image output section 300 scans and is actually output by the image output section 300.

The image storage section 206 stores identification data showing whether stored raster data is expanded by the binary expansion section 254 or by the multivalued expansion section 255 every picture element. Raster data and identification data corresponding to the raster data may be also stored in the same area and if correspondence between both is kept, they may be also stored separately.

If raster data is read, identification data corresponding to its picture element is also simultaneously read and supplied to the image output section 300.

Hereby, in the image output section 300, if the data of a multivalued picture element is output, processing such as changing screen ruling is enabled.

<1-3: Font Table>

Referring to FIG. 5, the font table used in this embodiment will be described below. As shown in FIG. 5, the font table specifies an expansion method every typeface such as Mincho typeface, a san serif font, Times, Arial, Courier and Century. "Only binary expansion" of specifications for an expansion method means that the expansion method selecting section 253 prohibits the multivalued expansion section 255 from being selected when a character is expanded to raster data and is mainly specified in case expansion processing seed is given priority.

In the meantime, "Imultivalued expansion allowed" means that the expansion method selecting section 253 allows the binary expansion section 254 and the multivalued expansion section 255 to be selected when expanded to raster data.

The selection depends upon a procedure of judgment described later.

Therefore, in principle, binary expansion or multivalued expansion is allowed by specifying "multivalued expansion allowed", however, if "only binary expansion" is specified an exception, multivalued expansion is prohibited and the relationship is similar to the relationship in the above specification of multivalued expansion by a user.

FIG. 5 shows that an expansion method can be specified every typeface, however, in addition, an expansion method may be also specified every style and stroke weight.

<1-4: Character Code Table>

Next, referring to FIG. 6, the character code table used in this embodiment will be described. As shown in FIG. 6, the character code table specifies an expansion method every character code defining a character.

That is, in this embodiment, an expansion method can be specified every character itself in addition to every typeface.

For Japanese fonts such as Mincho typeface and a san serif font, an English numeral, a hiragana character, a katakana character and a Chinese character can be classified in a code system. Therefore, an expansion method can be specified every English numeral, hiragana character, katakana character and Chinese character of Japanese fonts.

JIS kanji, shift JIS kanji, a punctuation mark, Unicode and others can be used independent of a character code system.

<2: Operation of Embodiment>

Next, the operation of the image processing section 200 in this embodiment will be described. First, referring to FIG. 7, the whole operation of the image processing section 200 will be described.

First, when the output of an image is instructed by the host computer 100, the image processing section 200 receives code image data in PDL in a step S101 and interprets the contents. The image processing section 200 identifies an object in code image data the plotting of which is instructed one by one in a step S102.

The image processing section 200 executes the plotting of a character in a step S103 if the identified object is a character and executes the plotting of a line in a step S104 if the identified object is a line such as a rule, a table, a straight line, a curve and a polygon. The above plotting means processing for expanding the outline data of a character and the vector data of a line to raster data and storing them in the image storage section 206 and the details will be described later.

In the meantime, if the identified object is raster (image) data such as a photograph and a picture, the image processing section 200 executes suitable processing such as filter processing, gradation adjustment processing and rotation/enlargement/reduction processing in a step S105 and stores the processed raster data in the image storage section 206.

Next, the image processing section 200 judges whether objects to be plotted on all pages to be output are processed or not and if a result of the judgment is negative, a processing procedure is returned to the step S101 again. In the meantime, as a result of the judgment is affirmative if objects to be plotted on all pages are processed, the image processing section 200 reads and supplies the stored raster data in a direction in which the image output section 300 scans in a step S107.

As described above, when the image processing section 200 receives code image data, it interprets the contents and executes processing according to objects to be plotted.

<2-1: Character Output>

Processing for plotting a character executed in the step S103 if the identified object is the character will be described in detail below.

<2-1-1: Determination Of Expansion Method>

Figure 8:
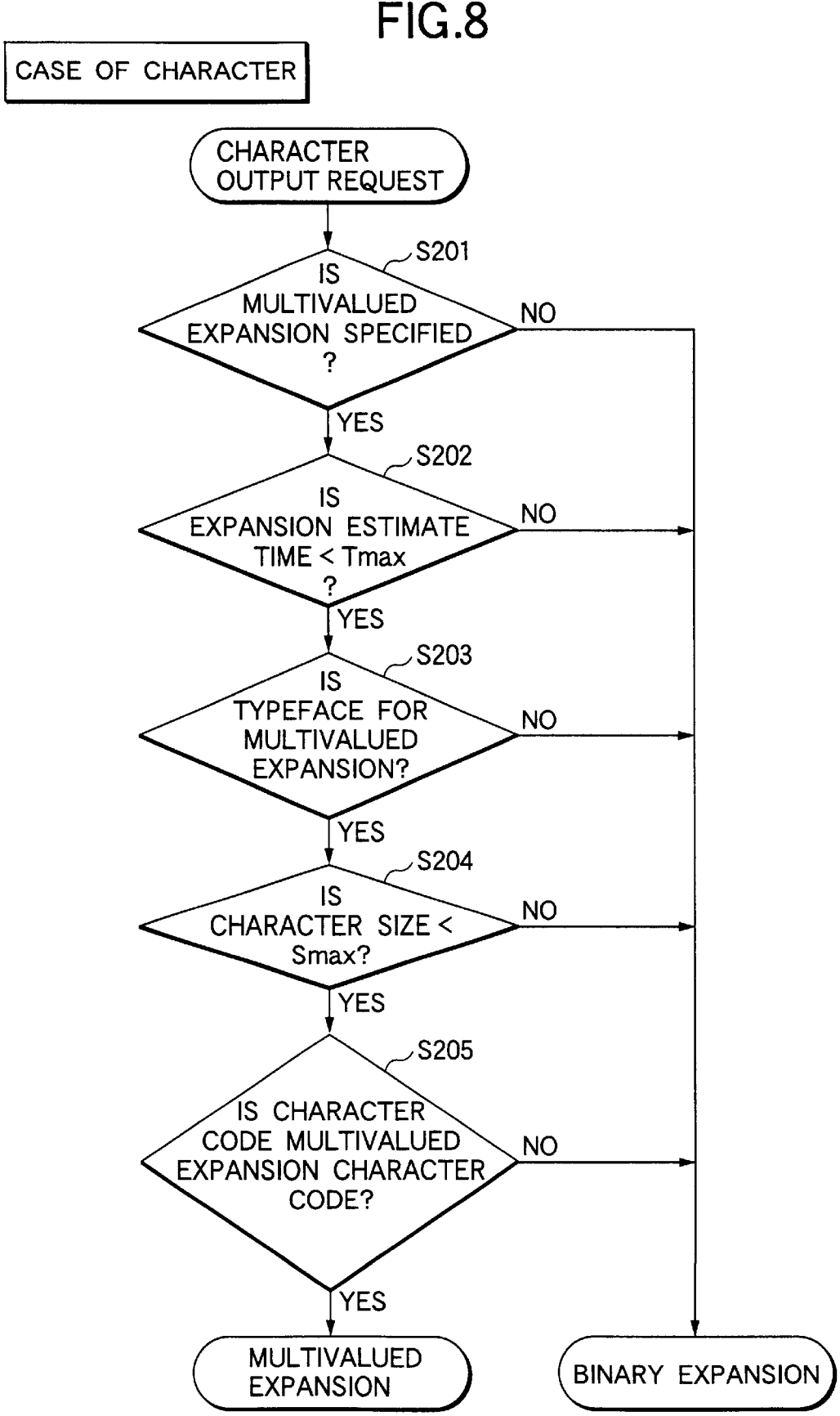
FIG. 8 is a flowchart showing the operation of the image processing section if the output of a character is requested.

First, the expansion method determining section 252 in the image processing section 200 judges whether multivalued expansion should be applied or binary expansion should be applied to an object identified as a character. FIG. 8 is a flowchart showing a procedure of the judgment.

As shown in FIG. 8, if an object identified as a character is output, the expansion method determining section 252 first judges in a step S201 whether multivalued expansion is specified by a user or not. The specification of multivalued expansion means that a user allows smoothing processing by operating the console panel 205 or the host computer 100 as described above.

If multivalued expansion is not specified, the expansion method determining section 252 determines the application of binary expansion to the corresponding character and in the meantime, if multivalued expansion is specified, the expansion method determining section further estimates time required for the multivalued expansion of the character in a step S202 and judges whether the estimated time is shorter than the threshold time Tmax or not.

In this embodiment, both time required for binary expansion and time required for multivalued expansion are estimated.

If time required for totalizing the pixel values of subpixels every picture element in multivalued expansion may be ignored, time required for multivalued expansion is considered the multiple of the number of subpixels into which one picture element is divided of time required for binary expansion because one picture element is divided into plural subpixels.

Figure 12A:
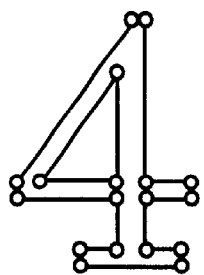
FIGS. 12A to 12D respectively explain the operation of the image processing section for the expansion of a character.

As the following character is complicated if many outline control points are provided to the character, it takes more time to expand the character by the quantity. The outline control points of a character mean coordinates for defining the outline of the character as shown by circles in FIG. 12A for example and are included in the font data of the character.

Therefore, time required for the binary expansion of a character can be readily calculated by interpreting the font data of the corresponding character, acquiring elements such as the total outline control points and totalizing by multiplying each element by a coefficient according to processing speed, and time required for the multivalued expansion of a character can be calculated as time equivalent to the multiple of the number of subpixels in one picture element of time required for binary expansion.

If time required for totalizing the pixel values of subpixels in multivalued expansion cannot be ignored, the above time required for totalization is further added to time required for multivalued expansion.

If it is judged that time required for multivalued expansion and estimated as described above exceeds time Tmax, the expansion method determining section 252 determines the application of binary expansion to a corresponding character and in the meantime, if it is judged that estimated time is shorter than time Tmax, processing proceeds to judgement in a step S203.

The expansion method determining section 252 does not judge in the step S202 whether time required for the multivalued expansion of a character is shorter than time Tmax or not but may compare time required for the binary expansion of a character and time required for the multivalued expansion of the character and judge based upon a result of the comparison. For example, the expansion method determining section may judge whether difference between both is within a threshold or not and may judge in combination of difference between both and time required for the multivalued expansion of a character.

The step S202 for estimating time required for the expansion of a character is not processing directly contributing to the speedup of expansion processing but is rather processing which may be considered as useless time when viewed from the whole expansion processing. Therefore, it is not suitable for the object to reduce processing time of the present invention to spend more time than required for the estimate.

The expansion method determining section 252 changes a procedure (a selection condition) of later judgment in the step S202 if time required for the multivalued expansion of a character cannot be calculated even when some time or longer time elapses. For example, in this case, the expansion method determining section 252 forcedly skips the procedure to the step S203 and determines the application of binary expansion to the corresponding character.

The expansion method determining section 252 interprets the font data of a character to be output in the step S203 and judges whether the specification of the typeface for an expansion method is "multivalued expansion allowed" or not, referring to the font table shown in FIG. 5.

If the expansion method determining section 252 judges that the specification of the typeface of a corresponding character for an expansion method is "only binary expansion", it determines the application of a binary expansion to the corresponding character and in the meantime, if the expansion method determining section judges "multivalued expansion allowed", it judges further in a step S204 whether the size of the corresponding character is a threshold Smax or smaller or not.

As the number of picture elements composing the following character is increased by the quantity if the size of a character is enlarged, it takes much time to expand the character and as a picture element for the character is relatively reduced, ridges are inconspicuous by binary expansion.

Conversely, as the number of picture elements composing a character is reduced by the quantity when the size of the character is reduced, it does not take much time to expand the character and as a picture element for the character is relatively enlarged, ridges are conspicuous by binary expansion.

The expansion method determining section 252 interprets the font data of a corresponding character, if it is judged that the character size is a threshold Smax or larger, the section determines the application of binary expansion to the corresponding character and in the meantime, if it is judged that the character size is smaller than a threshold Smax, it is judged further in the step S203 whether the character code of the corresponding character is a multivalued expansion character code or not.

The above multivalued expansion character code means a character code for which "multivalued expansion allowed" is specified in the character code table shown in FIG. 6. The expansion method determining section 252 interprets the font data of a corresponding character, if the section judges that the character code is not a multivalued expansion character code, it determines the application of binary expansion to the corresponding character and in the meantime, if the section judges that the character code is a multivalued expansion character code, it determines the application of multivalued expansion to the corresponding character.

Therefore, if che corresponding character is a Japanese font, the expansion method determining section 252 judges an expansion method according to which of an English numeral, a hiragana character, a katakana character and a Chinese character the corresponding character is.

<2-1-2: Character Execution>

Figure 10:
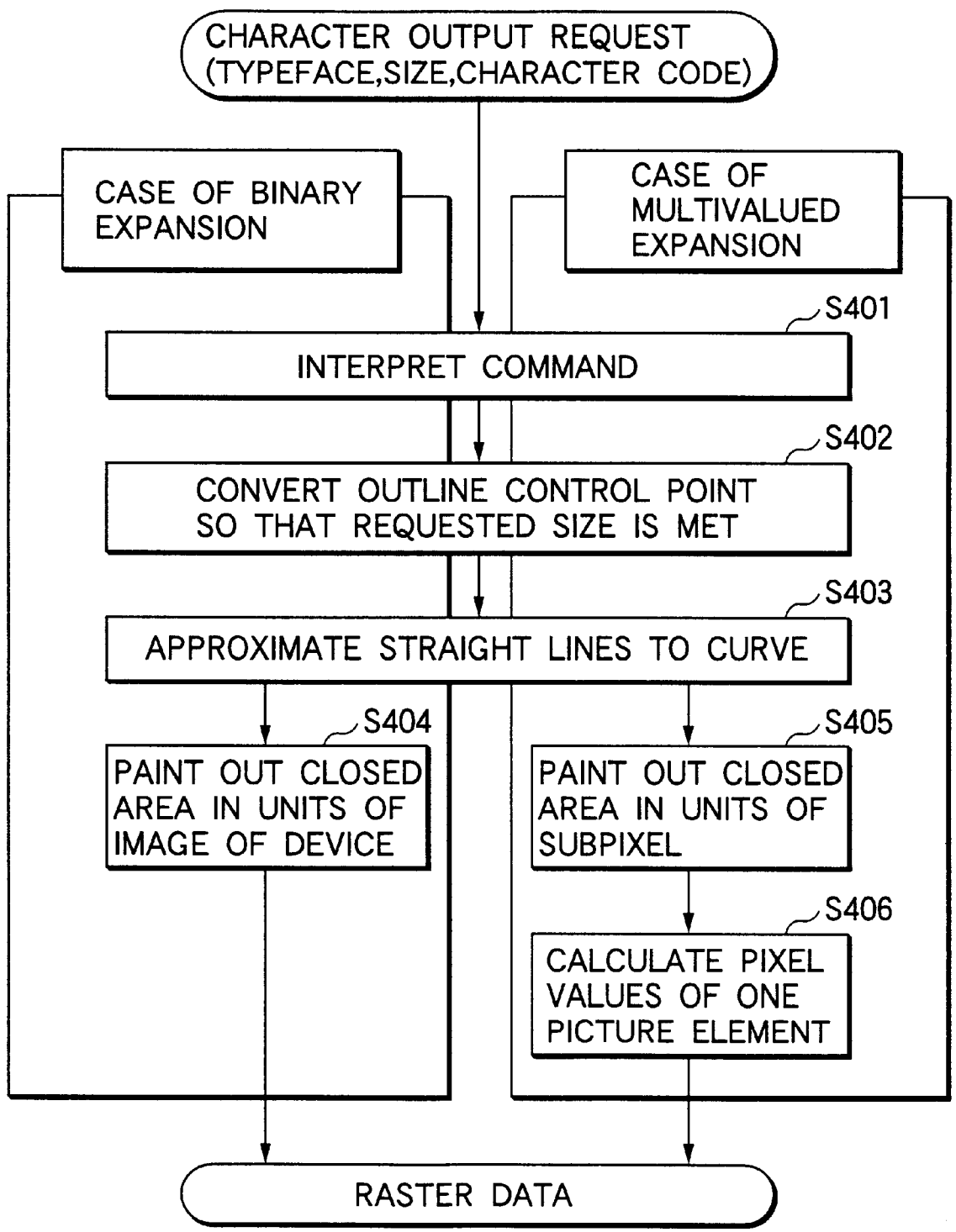
FIG. 10 is a flowchart showing the operation of the image processing section if the output of a character is requested.

If an identified object is a character as described above, the expansion method determining section 252 determines whether multivalued expansion should be applied or binary expansion should be applied to a character to be output. The expansion method selecting section 253 supplies font data related to the character to either the binary expansion section 254 or the multivalued expansion section 255 according to the above determination. The binary expansion section 254 or the multivalued expansion section 255 expands to raster data according to an either expansion method using the font data related to the character. Next, the expansion processing will be described in detail. FIG. 10 is a flowchart showing a procedure of the expansion processing.

As shown in FIG. 10, steps S401 to S403 are executed in common by the binary expansion section 254 and the multivalued expansion section 255, however, a step S404 is executed by only the binary expansion section 254 and in the meantime, steps S405 and S406 are executed by only the multivalued expansion section 255.

At the beginning, processing for binary expansion will be described.

Figure 11:
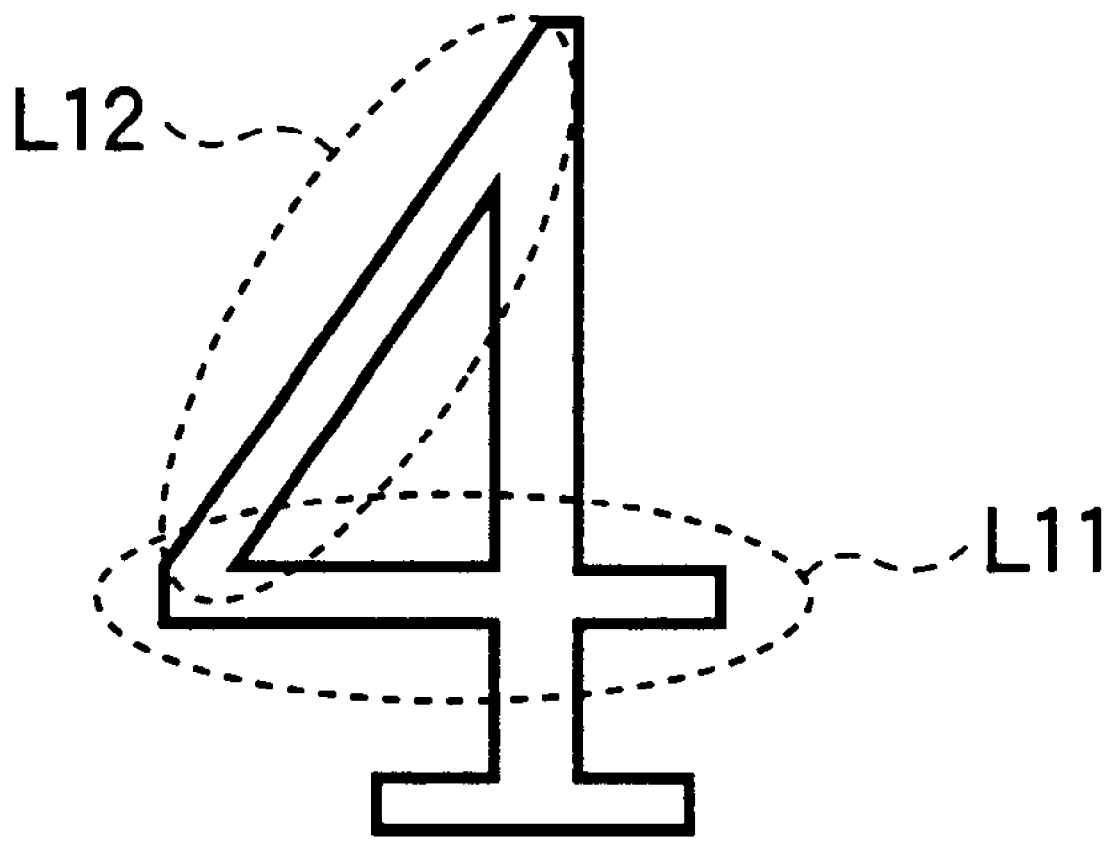
FIG. 11 explains hint information.

First, the binary expansion section 254 interprets font data related to a character to be output in the step S401 and decodes outline data, hint information and others. The above hint information means information for forcedly specifying the expansion method of a part of a character. For example, the outline of a numeral "4" in a typeface of Century is shown in FIG. 11, however, depending upon an expansion method and size, lines L11 and L12 are too thin or disappear and confused with a numeral "1". Hint information is required to intentionally thicken picture elements related to the lines L11 and L12 or expand so that they do not disappear. The hint information in this case is information for specifying so that picture elements related to the lines L11 and L12 are forcedly a plotted area.

Figure 12B:
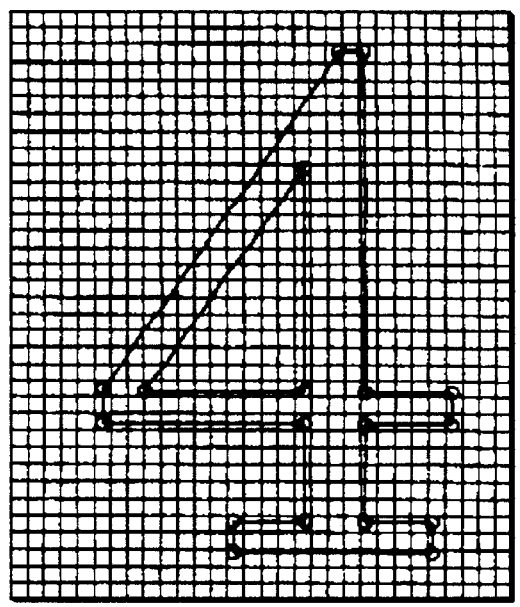

Next, the binary expansion section 254 positions outline control points in outline data on coordinates specified in coordinate data in size specified in size data in a pixel array corresponding to the resolution of the image output section 300 in the step S402. For example, the outline control points of the numeral 4 in the typeface of Century are shown by circles in FIG. 12A and the binary expansion section 254 positions the control points on the coordinates specified in coordinate data in size specified in size data in a pixel array corresponding to the resolution of the image output section 300 as shown in FIG. 12B.

If some control points positioned in the pixel array are specified so that they are connected via a curve, the binary expansion section 254 approximates plural straight lines to the curve if necessary in the step S403. The processing in the step S403 is arbitrary.

Further, the binary expansion section 254 gives each picture element in a closed area encircled by the positioned control points a pixel value using predetermined algorithm in the step S404. For example, if the closed area is overlapped with a picture element, a pixel value 1 is given to the picture element (painted out) and in the meantime, if not, a pixel value 0 is given to the picture element (not painted out).

The binary expansion section 254 writes a result of the processing to an area corresponding to a picture element of the image output section 300 by one to one in the image storage section 206. Hereby, raster data showing whether the following picture element should be painted out or not is stored with the raster data binarized in an area corresponding to each picture element of the image output section 300 in the image storage section 206.

Figure 12C:
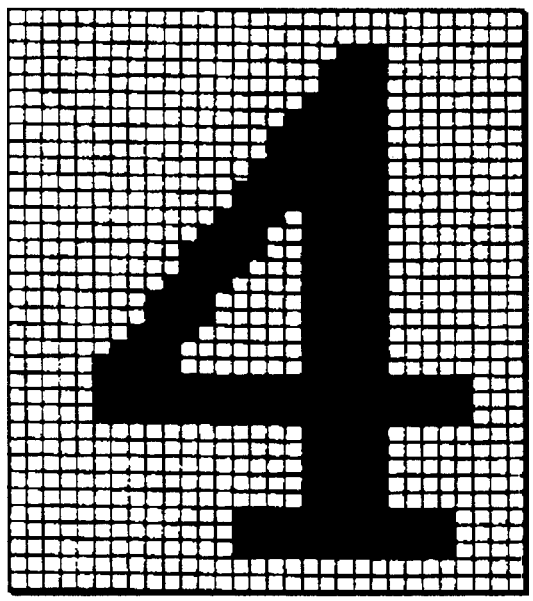

When such binarization processing is executed for a closed area in which an outline control point is positioned as shown in FIG. 12B for example, picture elements in the closed area are painted out together with its edge as shown in FIG. 12C.

The binary expansion section 254 also writes identification data showing that the raster data is expanded according to a binary system to an area related to its picture element in the image storage section 206 in binary expansion.

The binary expansion section 254 expands all characters for which the application of binary expansion is determined to raster data using font data.

Next, multivalued expansion processing will be described.

In this case, the multivalued expansion section 255 executes the similar operation to that of the binary expansion section 254 in the steps S401 to S403.

That is, the multivalued expansion section 255 interprets font data in the step S401, decodes required information, positions outline control points in outline data in a pixel array corresponding to the resolution of the image output section 300 in the step S402 and approximates plural straight lines to a curve connecting the positioned some control points in the step S403 if necessary.

The multivalued expansion section 255 divides each picture element in a closed area encircled by the positioned control points into subpixels in the step S405 and gives a pixel value every subpixel according to predetermined algorithm. For example, if the closed area accounts for a half of the area of a subpixel or more, a pixel value 1 is given to the subpixel and in the meantime, if not, a pixel value 0 is given to the subpixel.

Further, in the step S406, the multivalued expansion section calculates the total of pixel values given to the subpixels every picture element and writes the total to an area corresponding to a picture element of the image output section 300 by one to one in the image storage section 206 as a multivalued pixel value of the picture element. Hereby, in the image storage section 206, raster data showing the area gradient of the following picture element is multivalued and stored in an area corresponding to each picture element of the image output section 300.

Figure 12D:
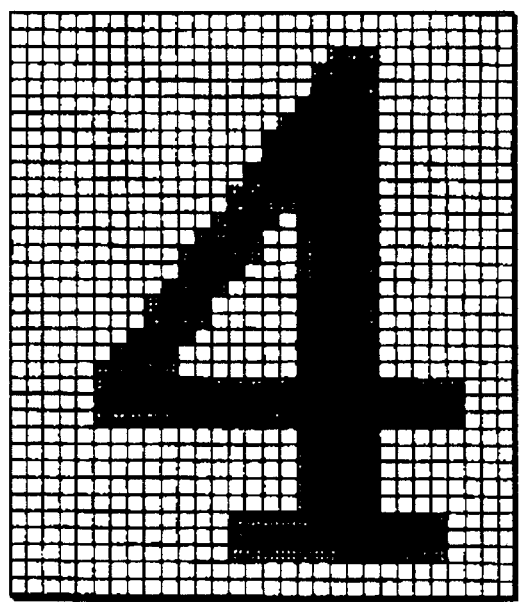

Therefore, when such multivaluing processing is executed for a closed area in which outline control points are positioned as shown in FIG. 12B for example, a pixel value corresponding to the ratio of the area of the closed area is given to the edge of the closed area as shown in FIG. 12D and in the meantime, the minimum value or the maximum value of the number of gradations corresponding to the number of divided subpixels is given to a part except the edge according to whether an image exists or not.

The multivalued expansion section 255 also writes identification data showing that the raster data is expanded in a multivalued system to an area related to the picture element in the image storage section 206 in multivalued expansion.

As described above, the multivalued expansion section 255 expands all characters for which the application of multivalued expansion is determined to raster data using font data.

<2-2: Line Execution>

Figure 7:
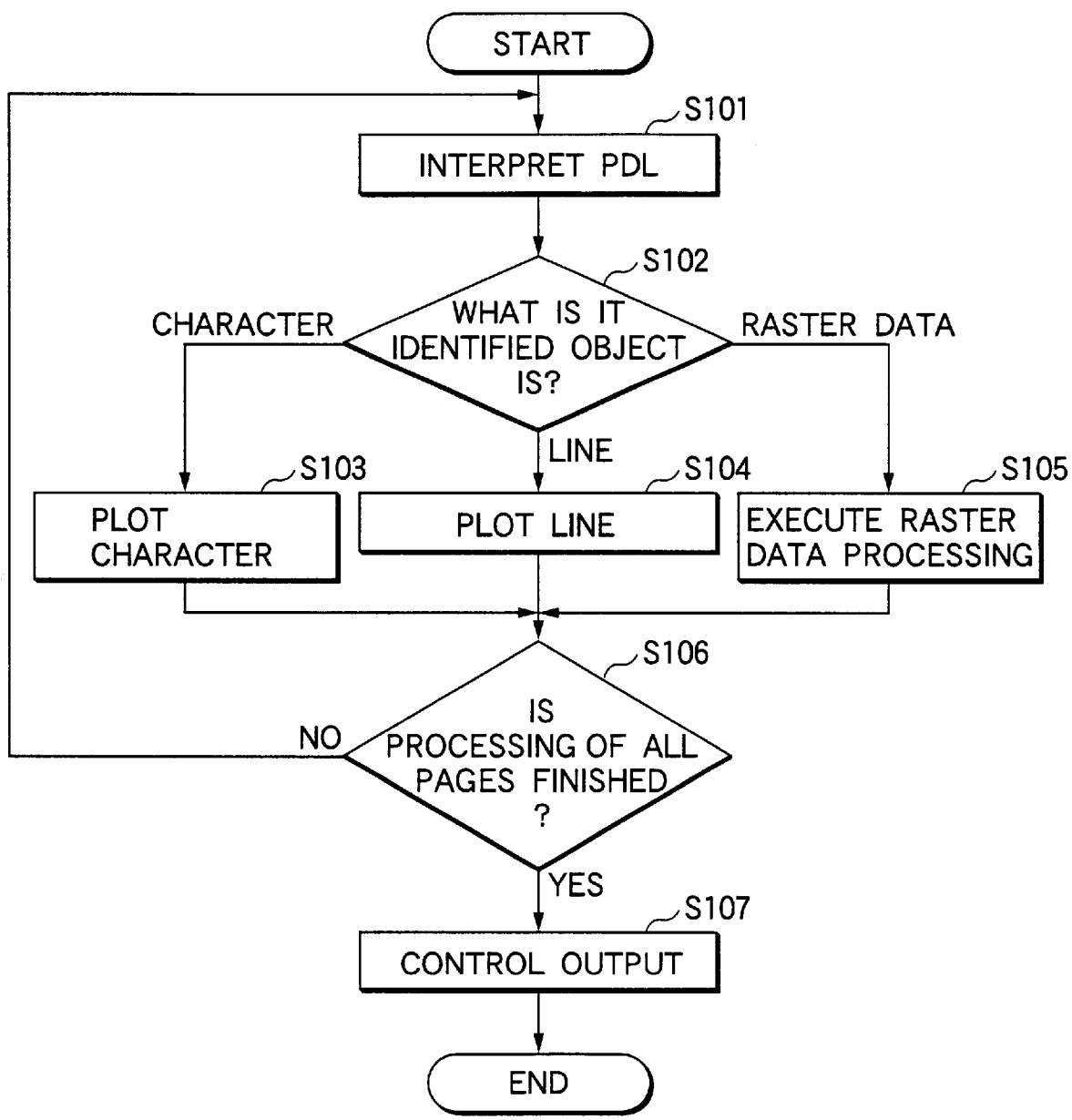
FIG. 7 is a flowchart showing the main operation of the image processing section.

Next, processing for plotting a line executed in the step S104 shown in FIG. 7 if an identified object is a line will be described.

<2-2-1: Determination of Expansion Method>

Figure 9:
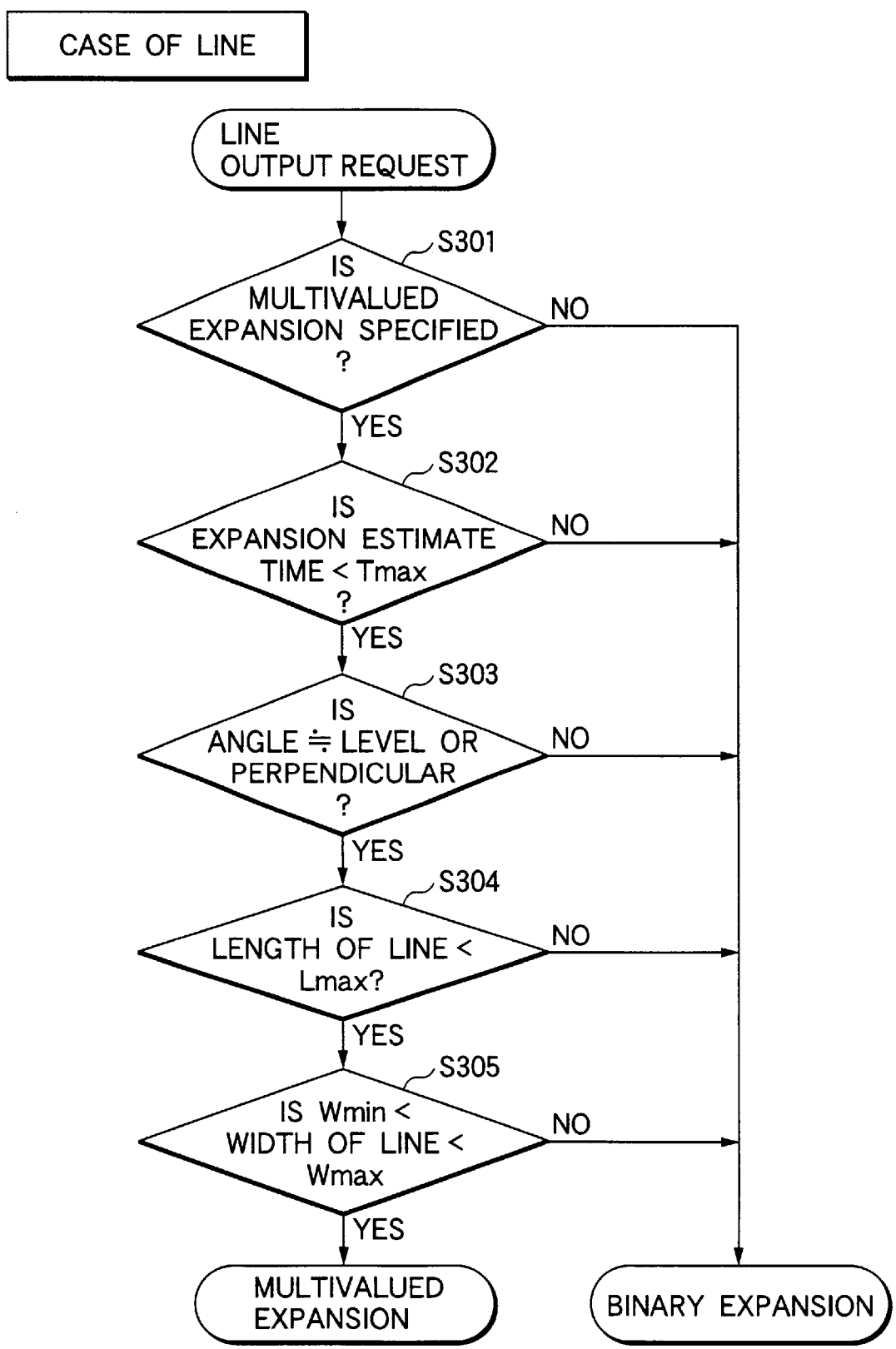
FIG. 9 is a flowchart showing the operation of the image processing section if the output of a line is requested.

The expansion method determining section 252 judges whether multivalued expansion processing should be applied or binary expansion processing should be applied to the object identified as a line as in the case of a character according to a flowchart shown in FIG. 9.

First, if an object identified as a line is output, the expansion method determining section 252 judges whether a user specifies multivalued expansion in the step S301 or not.

The expansion method determining section 252 determines the application of binary expansion to the line if multivalued expansion is not specified and in the meantime, if multivalued expansion is specified, the expansion method determining section 252 estimates time required for the multivalued expansion of the line further in the step S302 and judges whether the estimated time is shorter than a threshold Tmax or not.

As the number of picture elements composing the following line is many by the quantity if the line to be output is long, it takes much time to expand the image data of the line.

Therefore, time required for expanding the image data of the line can be readily calculated by interpreting the vector data of the line, acquiring the elements of the line such as the length by a method described later and totalizing by multiplying each element by a coefficient corresponding to processing speed, and time required for the multivalued expansion of the line can be calculated as time acquired by multiplying time required for binary expansion by the number of subpixels in one picture element as in the case of a character.

If time required for calculating the total pixel values of subpixels in multivalued expansion cannot be ignored, the time required for calculating the total is further added to time required for the multivalued expansion of a line as in the case of a character.

If the expansion method determining section 252 judges that time required for multivalued expansion estimated as described above is time Tmax or longer, the section determines the application of binary expansion to the line and in the meantime, if the section judges that the estimated time is shorter than time Tmax, it judges further in the step S303.

As in the case of a character, the expansion method determining section 252 does not judge in the step S302 whether time required for the multivalued expansion of a line is shorter than time Tmax or not but the expansion method determining section compares time required for the binary expansion of the line and time required for the multivalued expansion of the line and may judge based upon a result of the comparison.

Also, as in the case of a character, if the expansion method determining section 252 cannot acquire time required for the multivalued expansion of a line in the step S302 even when some time or longer time elapses, the expansion method determining section 252 may change a procedure of successive judgment.

The expansion method determining section 252 interprets the vector data of a line to be output in the step S303 and judges whether the angle of the line is close to level or a perpendicular according to a method described later.

It is well-known that when the angle of the line is close to level or a perpendicular, ridges are conspicuous by the quantity.

The expansion method determining section 252 determines the application of binary expansion to a line if the angle of the line is not close to level or a perpendicular and in the meantime, judges whether the line is shorter than a threshold Lmax or not further in the step S304 if the angle of the line is close to level or a perpendicular.

Generally, as the number of picture elements composing a line is many by the quantity if the line is long, it takes much time to expand as described above.

Therefore, the expansion method determining section 252 interprets the vector data of a line, acquires the length of the line according to a method described later, if the expansion method determining section judges the length of the line exceeds a threshold Lmax, it determines the application of binary expansion to the line and in the meantime, judges whether the width of the line is wider than a threshold Win or not and judges whether the width of the line is narrower than a threshold Wmax or not further in the step S305 if the expansion method determining section judges that the length of the line is shorter than the threshold Lmax.

For the length and the width of a line, if one is regarded as the width, the other can be regarded as the length. Therefore, the expansion method determining section 252 interprets the vector data of a line, acquires the width, if the expansion method determining section judges that the width exceeds the threshold Wmax, it determines the application of binary expansion to the line and in the meantime, the expansion method determining section determines the application of multivalued expansion to the line if it judges that the width of the line is narrower than the threshold Wmax.

However, if a line is short and the width is narrow, it is conceivable that the line has only minute area and ridges are inconspicuous. Therefore, the expansion method determining section 252 determines the application of binary expansion to the line in the step S305 if it judges that the width is narrower than the threshold Win.

The calculation of the angle, the length and the width of a line will be described below.

Figure 13:
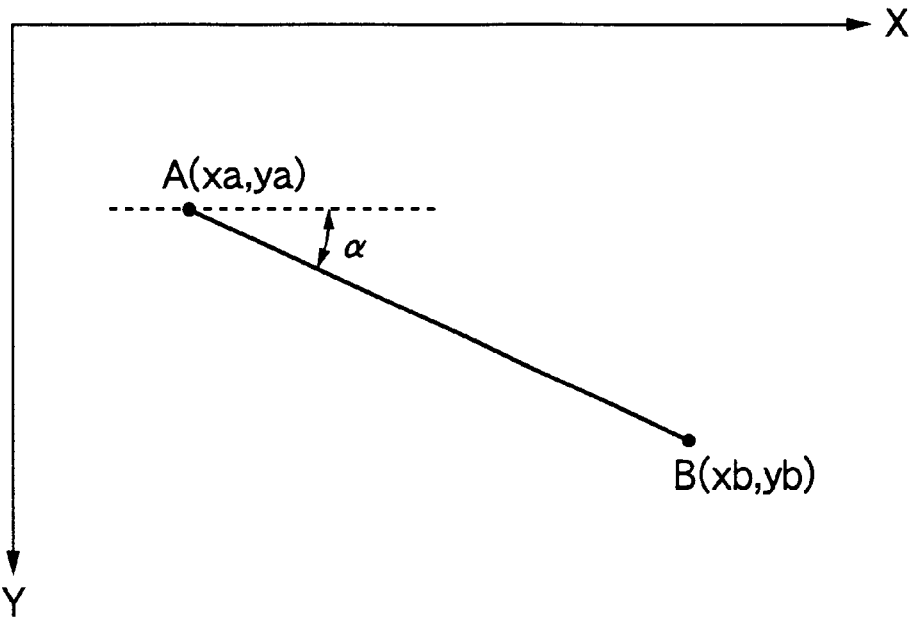
FIG. 13 explains the angle of a line in relation to processing by the image processing section.

Generally, if a line is output in PDL, an endpoint such as the start point and the end point is specified on coordinates on a page. As shown in FIG. 13, if a straight line to be plotted is defined by two endpoints A and B and the respective coordinates are shown as A (xa, ya) and B (xb, yb), an angle a between the straight line AB connecting both and x-axis on the page is acquired by the following expression.

If xa≈xb, $\alpha=\tan^{-1}\{(yb-ya)/(xb-xa)\}$.
If xa=xb, $\alpha=\pi/2$.

The length L of the straight line AB is acquired by the following expression.

$$L=\sqrt{\{(xb-xa)^2+(yb-ya)^2\}}$$

Figure 14:
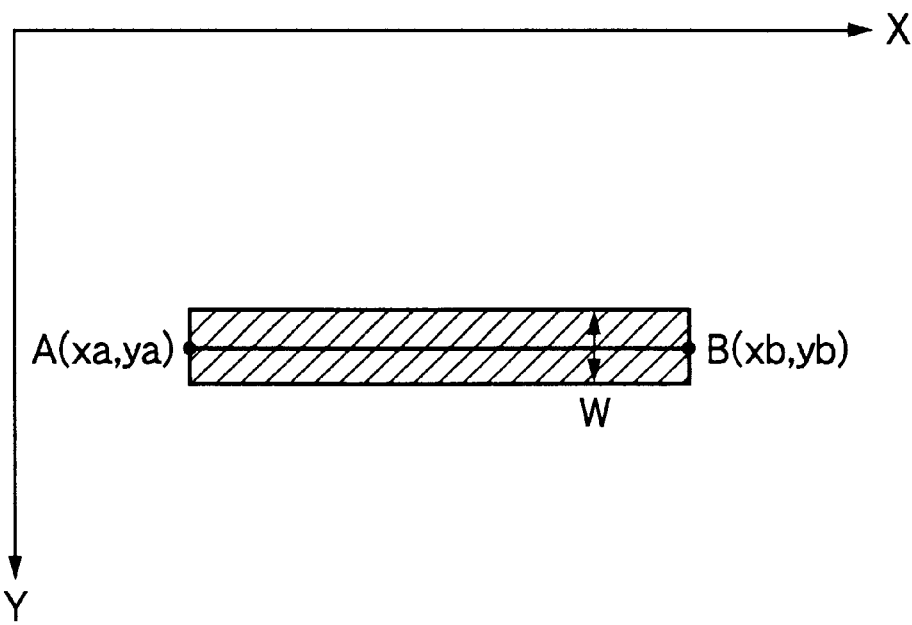
FIG. 14 explains the width or the length of a line in relation to processing by the image processing section.
Figure 15:
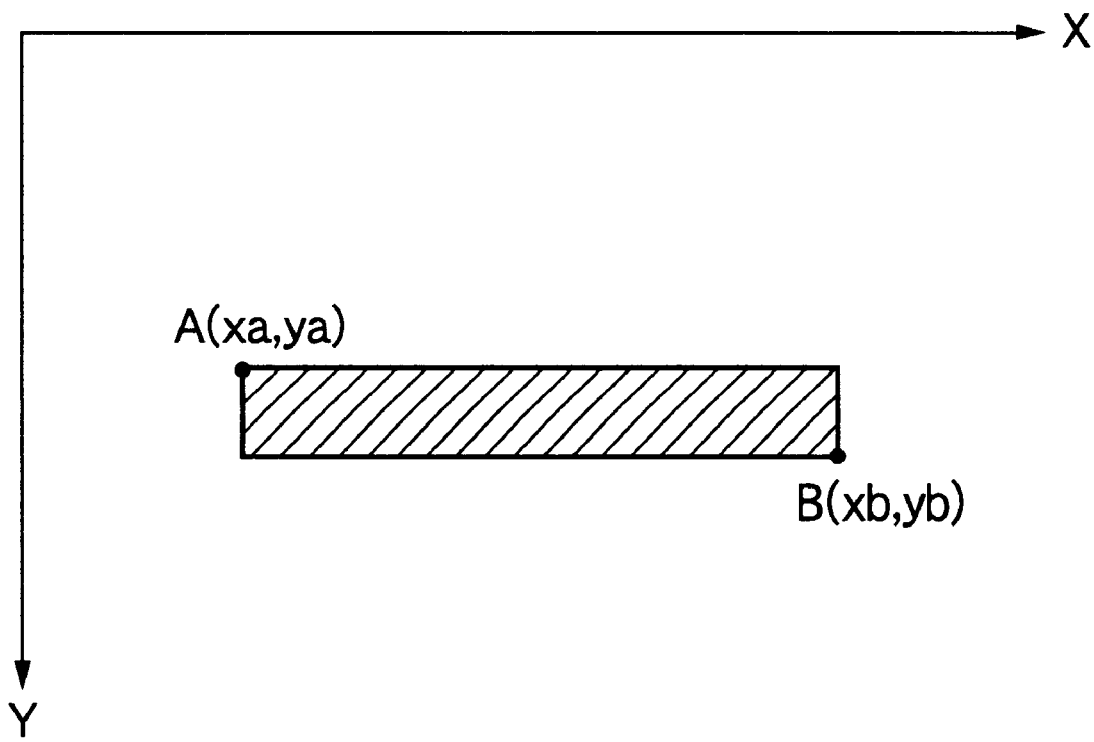
FIG. 15 explains the width or the length of a line in relation to processing by the image processing section.
Figure 17A:
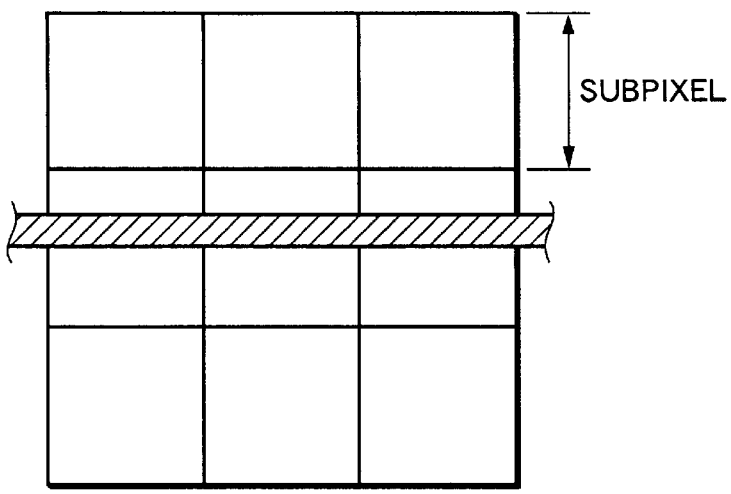

In the meantime, if a line provided with the width is output in PDL, a method shown in FIG. 14 in which the width is specified on a scale on a page together with the start point and the end point, a method shown in FIG. 15 in which diagonal coordinates are specified on coordinates on a page and others are conceivable.

In the method shown in FIG. 14, the width of the straight line AB is W (when a viewpoint is changed, it is conceivable that (xb−xa) is the width). In the method shown in FIG. 15, the width of the straight line AB is (yb−ya) (when a viewpoint is changed, it is conceivable that (xb−xa) is the width).

As described above, the expansion method determining section 252 can judge the above steps S301 to S305 by interpreting the vector data of a line and acquiring the angle, the length and the width of the line.

<2-2-2: Line Execution>

As described above, if an identified object is a line, the expansion method determining section 252 determines the application of multivalued expansion or the application of binary expansion. According to the above determination, the expansion method selecting section 253 supplies the vector data of the line to either the binary expansion section 254 or the multivalued expansion section 255. The binary expansion section 254 or the multivalued expansion section 255 expands the vector data of the line to raster data according to each expansion method.

A procedure of the above processing is basically the same as the case of a character shown in FIG. 10, however, both are different in that a concept of size in the expansion of a character does not exist. Therefore, the binary expansion section 254 or the multivalued expansion section 255 interprets endpoint information in vector data in the step S401 and positions the endpoint on specified coordinates in a pixel array corresponding to the resolution of the image output section 300.

The following procedure is the same as that in the case of a character. That is, the binary expansion section 254 binarizes a closed area encircled by endpoints and in the meantime, the multivalued expansion section 255 values the closed area at multiple values.

The above operation is executed for the objects of all characters and all lines included in code image data, the code image data of the objects is expanded to raster data by the binary expansion section 254 or the multivalued expansion section 255 and stored in a corresponding area in the image storage section 206 together with identification data. Identification data shows raster data is multivalued.

The raster data and the identification data stored in the image storage section 206 are read in a direction in which the image output section 300 scans. The image output section 300 forms an image based upon the raster data in maximum screen ruling if the identification data shows the raster data is binarized and in the meantime, forms an image based upon the raster data in less screen ruling if the identification data shows that the raster data is multivalued.

Hereby, an image based upon the binarized raster data is output at maximum resolution and in the meantime, an image based upon the multivalued raster data is output at halftone.

<3: Examples>

In the above embodiment, it is determined whether each object is binarized or multivalued, however, the present invention is not limited to this. For example, it may be also determined whether each page or the whole document is binarized or multivalued.

In this case, for the estimate (in the step S202) of time required for expanding the code image data of a character, time required for expanding the code image data of all characters existing on a page or time required for expanding the code image data of all characters existing in the whole document can be estimated by handling the total (the number of objects of characters) of characters existing on the page or the total of characters existing in the whole document as an element such as an outline control point.

Similarly, for the estimate (in the step S302) of time required for expanding the code image data of a line, time required for expanding the code image data of all lines existing on a page or time required for expanding the code image data of all lines existing in the whole document can be estimated by handling the total (the number of objects of lines) of lines existing on the page or the total of lines existing in the whole document as an element such as the length of the line.

In the above embodiment, the condition for judgment shown in FIGS. 8 and 9 are all executed, however, these conditions for judgment may be not necessarily executed. That is, it is desirable that these conditions for judgment are suitably combined according to a condition, environment and others.

Figure 18:
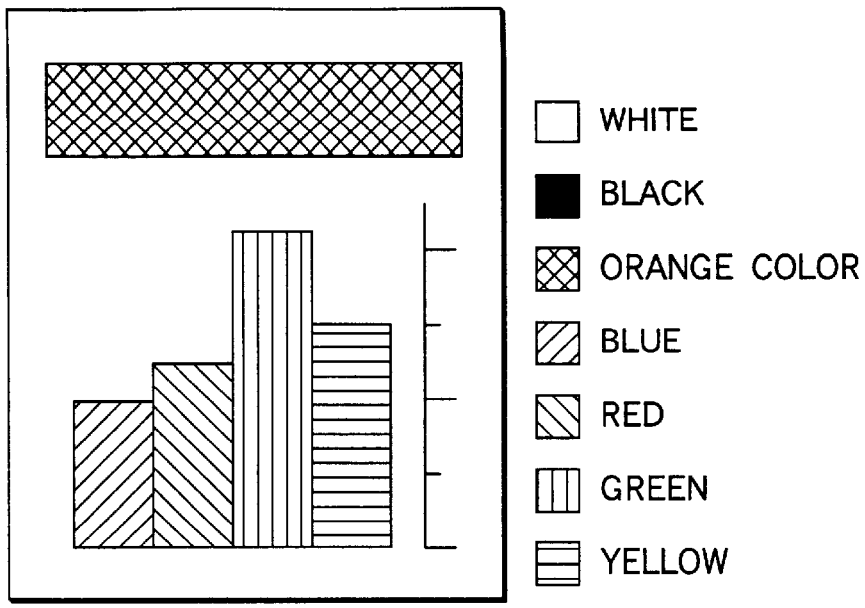
FIG. 18 shows an example of a document converted from picture description language (PDL) to a raster image in this embodiment.
Figure 19A:
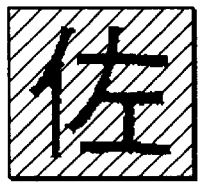
FIGS. 19A to 19E show enlarged views of a part shown in FIG. 18 and enlarged views every color component.
Figure 19B:
Figure 19C:
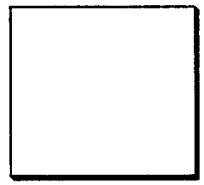
Figure 19D:
Figure 19E:
Figure 20:
FIG. 20 shows an example in case a picture area and a character respectively having the same color component are overlapped.

A character and a line in a document may be arranged in a raster image read from a scanner and a digital camera and a picture area such as a graph generated by graphic form generating software as shown in FIG. 18. Normally, if a picture area and a character or a line are overlapped, a pixel overlapped with the character or the line in the picture area is replaced with the pixel of the character or the line. For example, if a character is black and the background is blue, the color of a pixel overlapped with the character in a picture area is replaced from blue to black. FIGS. 19 show the state, FIG. 19A is an enlarged view showing a part in a circle shown in FIG. 18 and FIGS. 19B to 19E respectively show a state in which the enlarged view shown in FIG. 19A is decomposed into each color component of black (K), yellow (Y), magenta (M) and cyan (C). If a color printer corresponding to plural color components is used when an image shown in FIG. 18 is printed, a character/line area and a picture area are printed according to each specified color, however, if a monochrome printer corresponding to one color component is used, a halftone pixel value according to the color of a halftone pixel is allocated to the halftone pixel as 64 is allocated to a halftone pixel if the pixel value showing its maximum density is 255. If a printer provided with a monochrome print mode corresponding to one color component is used and printing in the mode is executed even if the printer is a color printer, a halftone pixel value according to the color of a halftone pixel is also similarly allocated. Naturally, in case a picture area has only the same one color component as a character or a line, the situation is also the same. In such a case, the part shown in FIG. 19A is converted as shown in FIG. 20 for example.

Figure 21A:
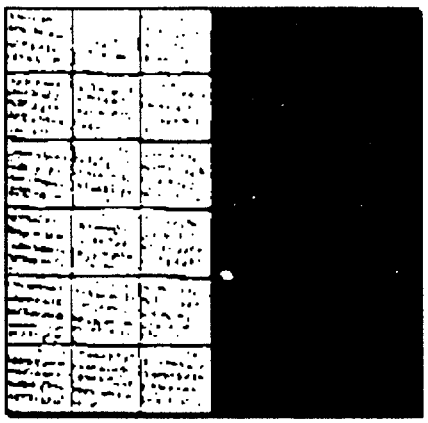
FIGS. 21A to 21D are partial enlarged views in case the character shown in FIG. 20 is expanded and partial enlarged views in case the expanded character is respectively printed.
Figure 21B:
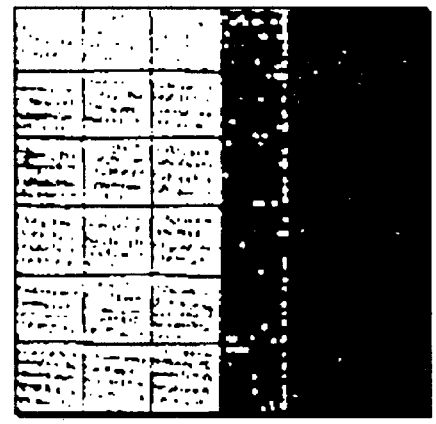
Figure 21C:
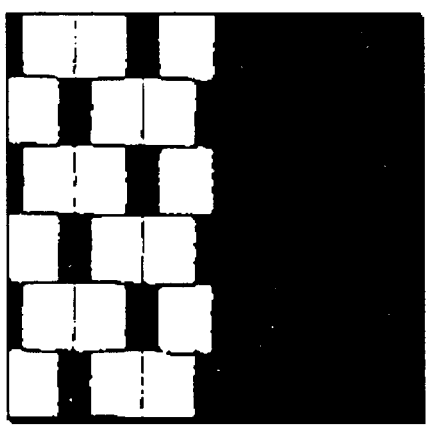
Figure 21D:
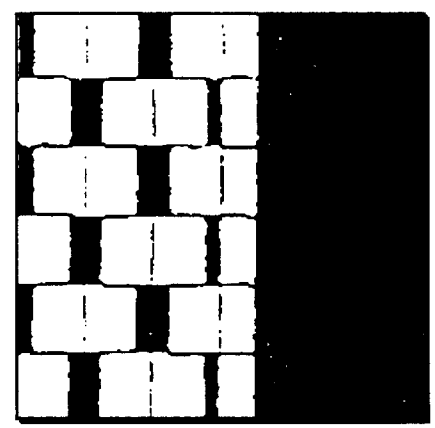

Even in the above case, for a method of expanding a character and a line, either binary expansion or multivalued expansion can be selected. FIG. 21A is an enlarged view showing a part in a circle shown in FIG. 20 in case a character is expanded in binary and FIG. 21B is an enlarged view showing a case in which multivalued expansion is executed. FIG. 21C shows a printout of the part shown in FIG. 21A and FIG. 21D shows a printout of the part shown in FIG. 21B. As also clear in comparison between FIG. 21C and FIG. 21D, if a character overlapped with a picture area is expanded in binary, a printout having the estimated quality of an image can be obtained, however, if multivalued expansion is executed, a void may be made near to a pixel to which a halftone pixel value is allocated of pixels in a character area. This phenomenon is caused because both a halftone pixel in a character for which multivalued expansion is executed and a halftone pixel in a picture area cannot be simultaneously printed. Therefore, in this embodiment, if the color component of a picture area to be a background when a character is expanded is the same as the color component of the character and the density of the area exceeds a threshold, the character is forcedly expanded in binary. The above threshold may be determined according to the development characteristics and others of a printer. In FIGS. 18 to 21, a case that multivalued expansion is executed for a character is described as an example, however, it is clear that multivalued expansion for a line in place of a character is also enabled.

As described above, according to the present invention, as smoothing processing is executed if necessary when code image data in PDL is expanded to plotted pattern data which is image data, a bulk memory is not required, processing time is reduced and high quality of plotted pattern data in which ridges are inconspicuous can be generated.

What is claimed is:

1. An image processing apparatus for expanding code image data to plotted pattern data comprising:
   first expansion means for expanding the code image data to binarized plotted pattern data;
   second expansion means for expanding the code image data to multivalued plotted pattern data; and
   selection means for selecting and applying either said first or said second expansion means as expansion means for expanding code image data.

2. The image processing apparatus of claim 1, further comprising:
   estimate means for estimating time required for said second expansion means to expand the code image data, wherein
   said selection means selects expansion means to be applied based upon a result of an estimate by said estimate means.

3. The image processing apparatus of claim 1, further comprising:
   estimate means for estimating time required for said second expansion means to expand the code image data; and
   said selection means changes a condition when expansion means is selected based upon a result of an estimate by said estimate means.

4. The image processing apparatus of claim 1, further comprising:
   first estimate means for estimating time required for said first expansion means to expand the code image data;
   second estimate means for estimating time required for said second expansion means to expand the code image data; and
   comparison means for comparing a result of an estimate by said first estimate means and a result of an estimate by said second estimate means, wherein
   said selection means selects expansion means to be applied based upon a result of comparison by said comparison means.

5. The image processing apparatus of claim 1, further comprising:
   prohibition means for prohibiting said selection means from selecting said second expansion means.

6. The image processing apparatus of claim 5, comprising:
   indication means for indicating that expansion by said second expansion means is not allowed, wherein
   said prohibition means prohibits selection by said second expansion means according to indication by said indication means.

7. The image processing apparatus of claim 1, further comprising:
   synthesis means for synthesizing plotted pattern data expanded by said first and second expansion means; and
   identification data generating means for generating identification data showing which of said first and second expansion means expands plotted pattern data synthesized by said synthesis means.

8. The image processing apparatus of claim 7, further comprising:
   output means for outputting plotted pattern data synthesized by said synthesis means according to identification data generated by said identification data generating means.

9. The image processing apparatus of claim 1, further comprising:
   line judging means for judging whether the code image data is data related to plotting a line and data equivalent to a predetermined condition or not, wherein
   said selection means selects expansion means to be applied based upon a result of judgment by said line judging means.

10. The image processing apparatus of claim 9, wherein the predetermined condition includes a condition related to the length or the width of a line to be plotted.

11. The image processing apparatus of claim 9, wherein the predetermined condition includes a condition related to the angle of a line to be plotted.

12. The image processing apparatus of claim 1, further comprising:

character judging means for judging whether the code image data is data related to plotting a character and data equivalent to a predetermined condition or not, wherein said selection means selects expansion means to be applied based upon a result of judgment by said character judging means.

13. The image processing apparatus of claim 12, wherein the predetermined condition includes a condition related to the typeface of a character to be plotted.

14. The image processing apparatus of claim 12, wherein the predetermined condition includes a condition related to the size of a character to be plotted.

15. The image processing apparatus of claim 12, wherein the predetermined condition includes a condition related to the character code of a character to be plotted.

16. The image processing apparatus of claim 12, wherein the predetermined condition includes a condition related to a color component of a character to be plotted and a color component of the background of the character.

17. The image processing apparatus of claim 12, wherein the predetermined condition includes a condition related to a color component of a line to be plotted and a color component of the background of the line.

18. An image processing method for expanding code image data to plotted pattern data, comprising:

a selection process for selecting whether the code image data is expanded to binarized plotted pattern data or multivalued plotted pattern data;

an expansion process for expanding the code image data to plotted pattern data selected in the selection process; and a synthesis process for synthesizing plotted pattern data expanded in the expansion process.

19. A record medium on which an image processing program for instructing a computer to expand code image data to plotted pattern data is recorded, wherein the image processing program instructs a computer to select whether the code image data is expanded to binarized plotted pattern data or to multivalued plotted pattern data;

the image processing program instructs said computer to expand the code image data to the selected plotted pattern data; and the image processing program instructs said computer to synthesize the expanded plotted pattern data.

* * * * *